(12) United States Patent
Oh

(10) Patent No.: US 9,415,311 B2
(45) Date of Patent: *Aug. 16, 2016

(54) LOCATION-BASED ONLINE GAMES FOR MOBILE DEVICES AND IN-GAME ADVERTISING

(71) Applicant: Hyung Gyu Oh, Los Angeles, CA (US)

(72) Inventor: Hyung Gyu Oh, Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/829,334

(22) Filed: Aug. 18, 2015

(65) Prior Publication Data

US 2015/0352445 A1  Dec. 10, 2015

Related U.S. Application Data

(63) Continuation of application No. 14/225,278, filed on Mar. 25, 2014, now Pat. No. 9,108,111, which is a continuation of application No. 13/744,199, filed on Jan. 17, 2013, now Pat. No. 8,678,931.

(60) Provisional application No. 61/587,602, filed on Jan. 17, 2012.

(51) Int. Cl.

| | |
|---|---|
| *A63F 9/24* | (2006.01) |
| *A63F 13/00* | (2014.01) |
| *A63F 13/577* | (2014.01) |
| *G07F 17/32* | (2006.01) |

(Continued)

(52) U.S. Cl.
CPC .............. *A63F 13/577* (2014.09); *A63F 13/12* (2013.01); *A63F 13/69* (2014.09); *G07F 17/3225* (2013.01); *A63F 2300/302* (2013.01); *A63F 2300/406* (2013.01); *A63F 2300/407* (2013.01); *A63F 2300/5506* (2013.01); *A63F 2300/5533* (2013.01); *A63F 2300/5573* (2013.01); *A63F 2300/643* (2013.01); *A63F 2300/65* (2013.01); *A63F 2300/69* (2013.01); *A63F 2300/8094* (2013.01)

(58) Field of Classification Search
CPC ......... A63F 13/00; A63F 13/12; A63F 13/28; A63F 13/332; A63F 13/335; A63F 13/35; A63F 13/58; A63F 13/61; A63F 13/65; A63F 13/79; A63F 13/795; A63F 2300/302; A63F 2300/406; A63F 2300/407; A63F 2300/5506; A63F 2300/5533; A63F 2300/5573; A63F 2300/65; A63F 2300/69; A63F 2300/8094; G07F 17/3225

See application file for complete search history.

(56) References Cited

U.S. PATENT DOCUMENTS

| | | | | |
|---|---|---|---|---|
| 7,690,992 | B2* | 4/2010 | Itou ........................ | A63F 13/00 463/30 |
| 7,946,919 | B2* | 5/2011 | Piccionelli .............. | A63F 13/12 463/1 |

(Continued)

*Primary Examiner* — Milap Shah
(74) *Attorney, Agent, or Firm* — Procopio, Cory, Hargreaves & Savitch, LLP

(57) ABSTRACT

Providing a location-based online game for a plurality of mobile devices, including: assigning a force field around a player corresponding to each mobile device of the plurality of mobile devices, wherein a radius of the force field is proportional to a score or experience point of the player in the online game; determining a location of said each mobile device; calculating colliding forces among the plurality of mobile devices and virtual environment created in the online game; providing a forum to enable a battle among the plurality of mobile devices and the virtual environment which are calculated as being in the colliding forces and sampling metadata including water, highway, road, grass, forest, business area and residential area to generate the online game.

4 Claims, 10 Drawing Sheets

(51) Int. Cl.
*A63F 13/69* (2014.01)
*A63F 13/30* (2014.01)

(56) References Cited

U.S. PATENT DOCUMENTS

| | | | | |
|---|---|---|---|---|
| 8,628,420 B2* | 1/2014 | Chhabra | H04W 4/02 | |
| | | | 463/1 | |
| 8,678,931 B2* | 3/2014 | Oh | G07F 17/3225 | |
| | | | 340/539.13 | |
| 9,108,111 B2* | 8/2015 | Oh | G07F 17/3225 | |
| 2002/0103031 A1* | 8/2002 | Neveu | A63F 13/06 | |
| | | | 463/49 | |
| 2002/0142834 A1* | 10/2002 | Sobue | A63F 13/12 | |
| | | | 463/30 | |
| 2003/0040347 A1* | 2/2003 | Roach | A63F 13/12 | |
| | | | 463/1 | |
| 2003/0224855 A1* | 12/2003 | Cunningham | A63F 13/10 | |
| | | | 463/41 | |
| 2004/0248631 A1* | 12/2004 | Hirai | A63F 13/10 | |
| | | | 463/4 | |
| 2009/0017913 A1* | 1/2009 | Bell | A63F 13/12 | |
| | | | 463/40 | |
| 2009/0106672 A1* | 4/2009 | Burstrom | A63F 13/12 | |
| | | | 715/757 | |
| 2010/0022301 A1* | 1/2010 | Carpenter | A63F 13/12 | |
| | | | 463/30 | |
| 2012/0094770 A1* | 4/2012 | Hall | A63F 1/00 | |
| | | | 463/42 | |
| 2012/0309480 A1* | 12/2012 | Kashitani | A63F 13/10 | |
| | | | 463/8 | |
| 2012/0329554 A1* | 12/2012 | Mgrdechian | G06Q 30/0207 | |
| | | | 463/29 | |
| 2013/0196773 A1* | 8/2013 | Lockeby | H04W 4/023 | |
| | | | 463/42 | |
| 2013/0225200 A1* | 8/2013 | Ben Hamida | H04W 64/00 | |
| | | | 455/456.1 | |

* cited by examiner

US 9,415,311 B2

LOCATION-BASED ONLINE GAMES FOR MOBILE DEVICES AND IN-GAME ADVERTISING

CROSS-REFERENCE TO RELATED APPLICATIONS

This application is a continuation application of U.S. application Ser. No. 14/225,278 filed on Mar. 25, 2014 (now U.S. Pat. No. 9,108,111), which is a continuation application of U.S. application Ser. No. 13/744,199 filed on Jan. 17, 2013 (now U.S. Pat. No. 8,678,931), which claims the benefit of priority under 35 U.S.C. §119(e) of U.S. Provisional Patent Application No. 61/587,602, filed Jan. 17, 2012, entitled "Location-Based Online Games for Mobile Devices and In-Game Advertising." The disclosure of the above-referenced application is incorporated herein by reference.

SUMMARY

The present invention provides for a location-based online game for a plurality of mobile devices.

In one implementation, a non-transitory computer-readable storage medium storing a computer program for a location-based online game for a plurality of mobile devices is disclosed. The program including executable instructions that cause the computer to: assign a force field around a player corresponding to each mobile device of the plurality of mobile devices, wherein a radius of the force field is proportional to a score or experience point of the player in the online game; determine a location of said each mobile device; calculate colliding forces among the plurality of mobile devices and virtual environment created in the online game; provide a forum to enable a battle among the plurality of mobile devices and the virtual environment which are calculated as being in the colliding forces; and sample metadata including water, highway, road, grass, forest, business area and residential area to generate the online game.

In another implementation, a location-based online game system is disclosed. The system includes: a processor configured to assign a force field around a player corresponding to each mobile device of the plurality of mobile devices, the processor also configured to determine a location of said each mobile device, wherein a radius of the force field is proportional to a score or experience point of the player in the online game; a collision detector configured to calculate colliding forces among the plurality of mobile devices and virtual environment created in the online game, the collision detector operating in conjunction with the processor to provide a forum to enable a battle among the plurality of mobile devices and the virtual environment which are calculated as being in the colliding forces; and a terrain builder configured to build a height map and terrain metadata including water, highway, road, grass, forest, business area and residential area.

Other features and advantages of the present invention will become more readily apparent to those of ordinary skill in the art after reviewing the following detailed description and accompanying drawings.

DETAILED DESCRIPTION

Certain implementations as described herein provide for location-based online games for mobile devices and in-game advertising. Some implementations define user interaction scenarios for a 3-D online game for mobile devices that merge real and virtual space to create strong interactions between players in the real world. Implementations also generate 3-D game spaces on-the-fly that are different every time a user plays the game. Implementations also include in-game advertising techniques. After reading this description it will become apparent how to implement the invention in various implementations and applications. Although various implementations of the present invention will be described herein, it is understood that these implementations are presented by way of example only, and not limitation. As such, this detailed description of various implementations should not be construed to limit the scope or breadth of the present invention.

Figure 1:
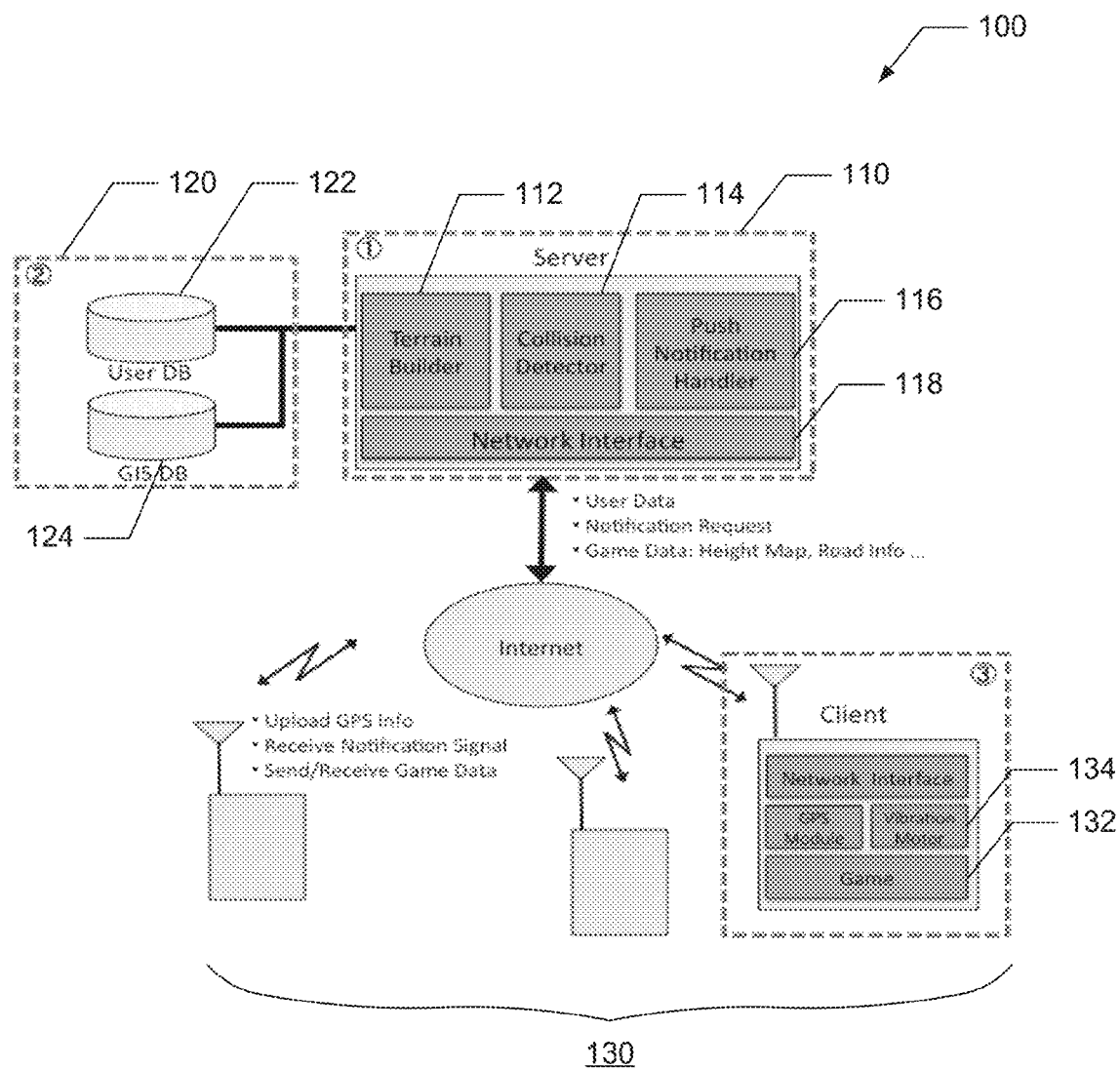
FIG. 1 is a functional block diagram of a location-based online game system in accordance with one implementation of the present invention.

FIG. 1 is a functional block diagram of a location-based online game system 100 in accordance with one implementation of the present invention. The system 100 comprises a game server 110, database 120, and a plurality of mobile clients 130. The server 110 includes a terrain builder 112, a collision detector 114, a push notification handler 116, and a network interface, and is responsible for detecting collisions between players (represented by mobile clients 130) in the real world, generating the 3-D game world, initiating games and managing user database 122. In one implementation, the server 110 uses the network interface 118 to call on HTTP Rest APIs and communicate with client devices and other web-based servers.

Collision Detector

In the game using this system 100, in one implementation, each player has the supernatural psychic force that spherically surrounds the player and its radius is proportional to the player's score or experience point in the game. Once a player creates an account in the game, the force of the player becomes detectable by other players and a mobile client 130 starts uploading its GPS data to the game server 110. In one implementation, the force coexists in both real and virtual space but the players cannot sense another player's force without a mobile device on which the game is installed.

For every pre-defined time interval, the game server 110 calculates all pairs of "colliding forces" through GPS coordinate distance calculations (e.g., by the collision detector 114). The server 110 then sends notification messages (e.g., by the push notification handler 116) to the players whose forces are intersecting with others so that the players can realize the "colliding forces".

Figure 2:
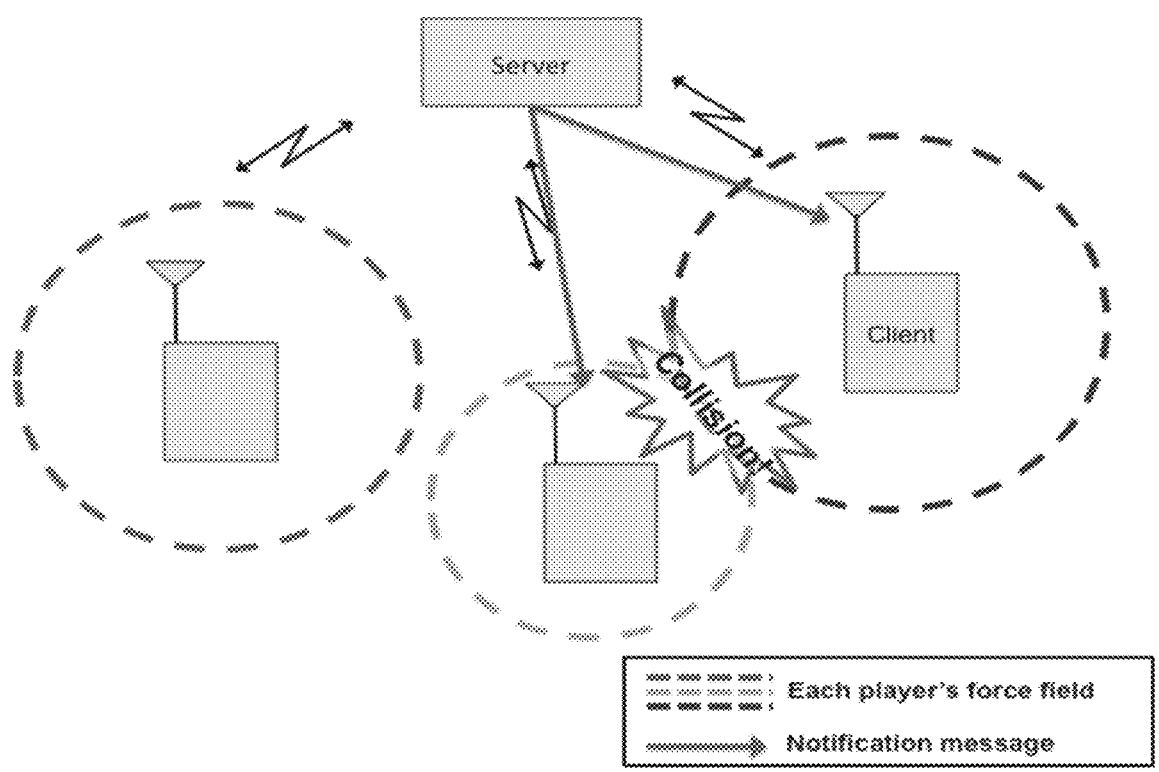
FIG. 2 shows one example of a PVP mode collision.

There are two collision modes. One is the player-vs-player (PVP) mode and the other is player-vs-environment (PVE) mode. PVP mode is when only the players' forces are colliding. In this mode, the game would be a free-for-all competing mode. FIG. 2 shows one example of a PVP mode collision.

Figure 3:
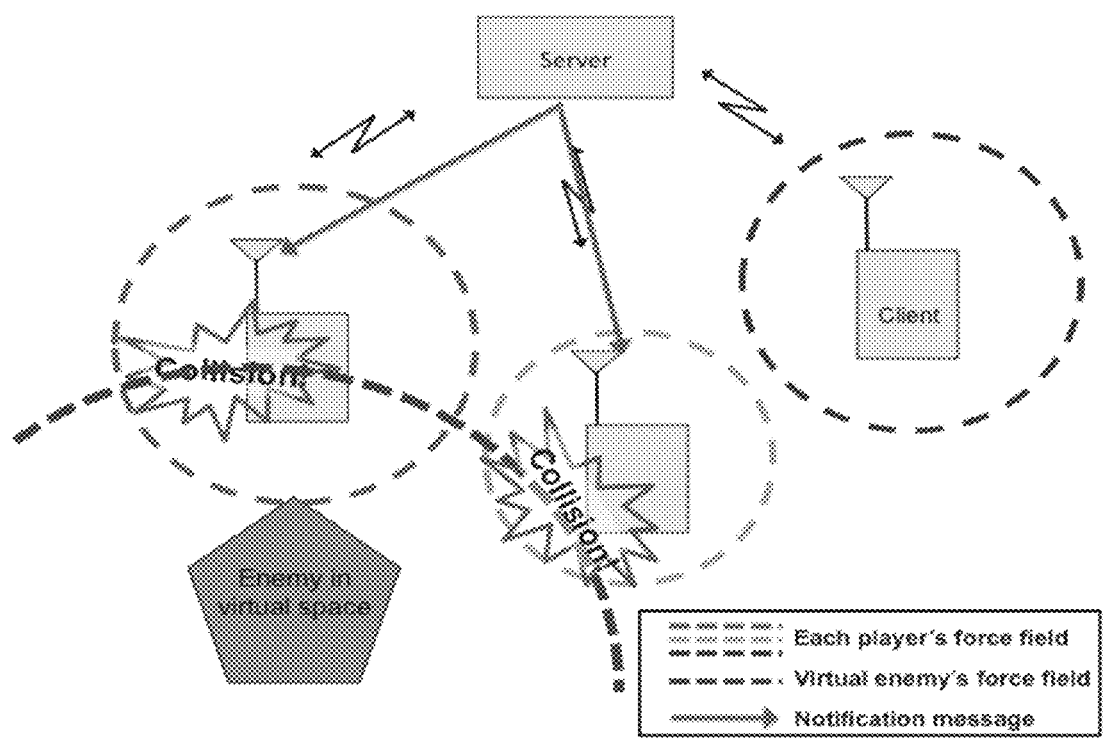
FIG. 3 shows one example of a PVE mode collision.

For the diversity of the game play, the game server 110 randomly spawns virtual characters or monsters on geo-points. As a virtual monster also has a psychic force, there could be the force field collisions between the monster and players and it triggers a battle of the PVE mode, which is a cooperating mode against a virtual monster. FIG. 3 shows one example of a PVE mode collision.

Terrain Builder

After the collision detection is complete, the server 110 generates height maps (e.g., the terrain builder 112) that clients 130 can download for each collision pair. Initially, a rectangular target area that includes all players' geo-locations is decided. The server 110 then calculates a sampling rate of the raw earth elevation data set in geographic information system (GIS) database 124, which is a high resolution digital topographic database of Earth because the size of the 3D game map is fixed regardless of the actual size of the target areas. Therefore, the varying sampling rate implies that the smaller the target area is, the finer the details of the real terrain are preserved and vice versa. Next step is to sample the elevation data and mosaic them to build a 2-D array of the height map of the target area.

Figure 4:
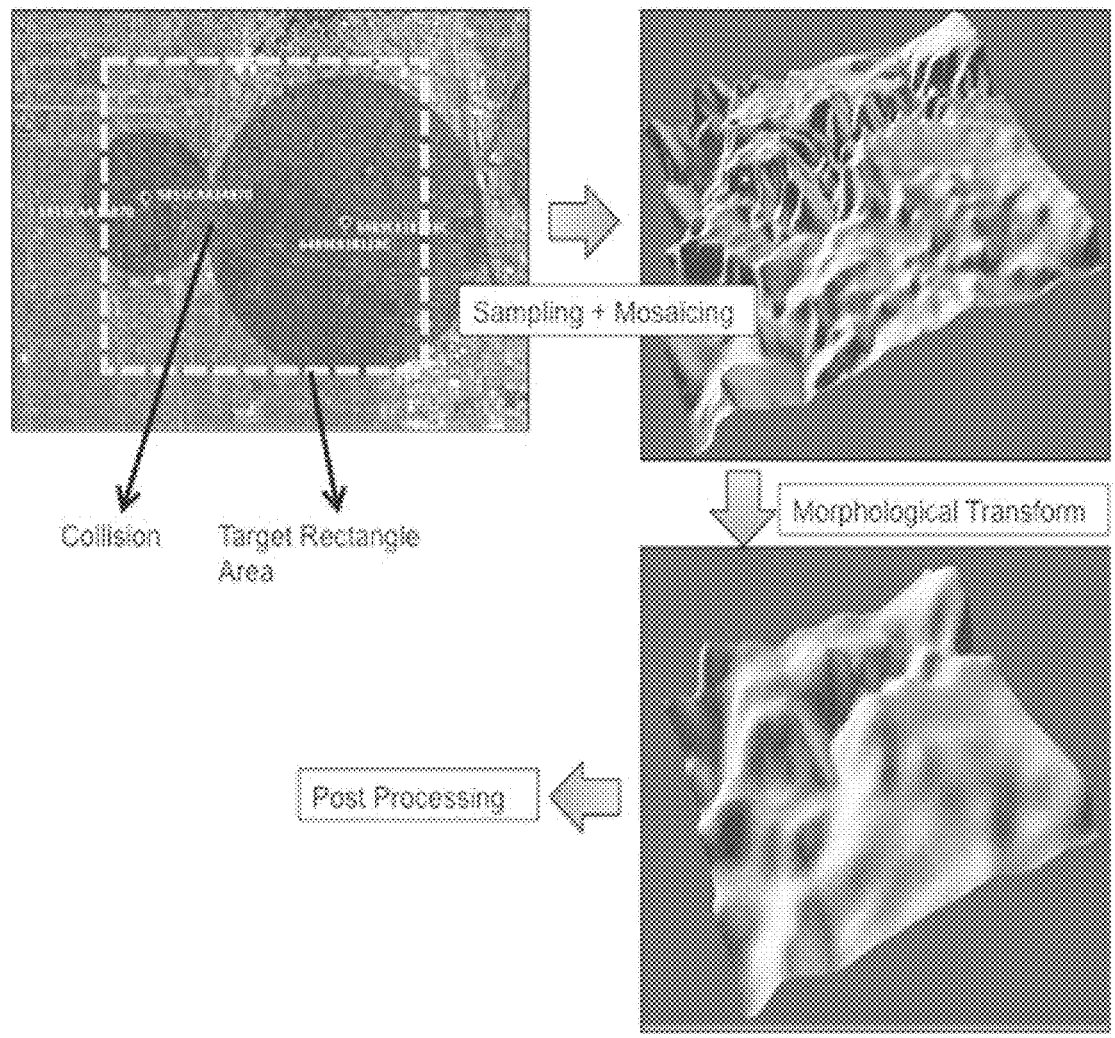
FIG. 4 shows one example of terrain building.

Morphological transforms such as smoothing, erosion and dilation are applied on the 2-D array in order to make the generated terrain continuous for the game. Finally, the post processing that modifies the height map for the landmark objects, the road objects and the ocean object is applied. FIG. 4 shows one example of terrain building.

Database

The user database 122 is a general database that manages the player's information such as name, ID, geo location, force radius, log-in status and so on. The GIS database 124 includes various kinds of geospatial data such as Earth elevation, water-land mask, highway structure, geo-points and game assets of landmark buildings and so on. Some of them are public data such as Shuttle Radar Topography Mission (SRTM) and Tiger DB, and some of them could be proprietary data sets from other data providers. If needed, it is also possible for the game provider or developer to create his or her own geospatial database for the game. What database to adopt is dependent on the game that will use this system 100 and the system itself is totally separated from the decision of the data sets.

Mobile Client

Mobile clients 130 are responsible for capturing GPS locations and uploading them in the background, handling collisions and game triggering signals from the game server 110 and running the game 132. Any kind of games can be installed if the mobile device supports required functions and the game 132 makes use of this system 100.

One useful feature in the mobile client is the vibration motor pattern control 134. It is possible for the game server 110 to categorize players into a couple of characters based on their game play history and each character has its own vibration pattern. The opponent's character data is embedded in the notification signal so that the client device can generate unique vibration pattern when it receives the push notification. It will help the receiver intuitively sense the battle event and recognize his or her opponents with intriguing feedbacks.

In-Game Advertising

There are three different ways of advertising for the mobile games using this system 100: advertising on the preview map screen; advertiser's landmarks in the game space; and advertising through PVE battles.

Advertising on The Preview Map Screen

Figure 5:
FIG. 5 shows one example of advertising on the preview map screen.

This is a general advertising that is widely adopted now. An advertisement can be directly embedded on the top or bottom of the preview map screen without blocking the map view and other control buttons. FIG. 5 shows one example of advertising on the preview map screen.

Advertiser's Landmarks in the Game Space (Selling Landmark Assets)

Figure 6:
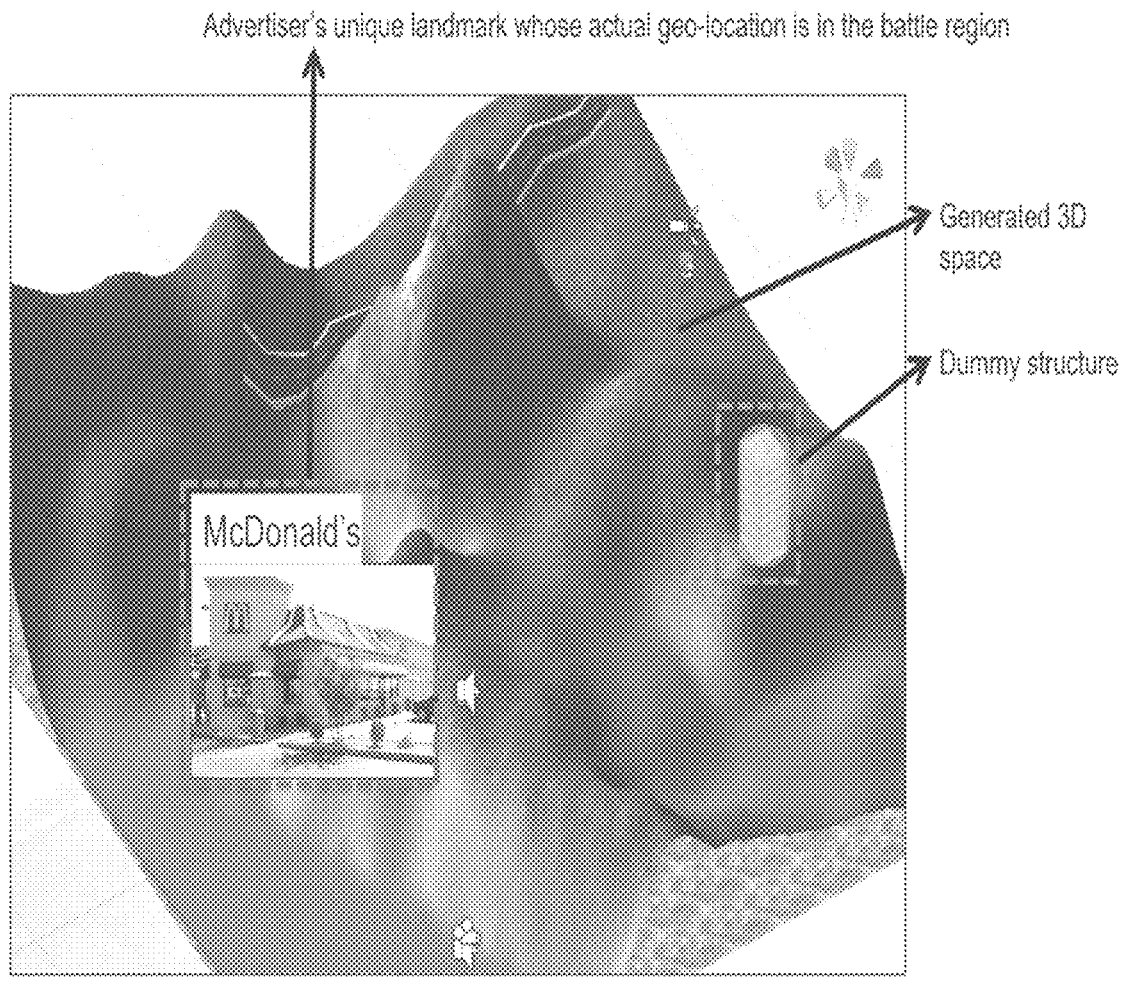
FIG. 6 shows one example of an instantiated advertiser's landmark asset in the game.

As the landmark buildings in the game space are visually distinctive and play important roles during the battle, it is also possible to sell the landmark itself to the clients. That is, the advertiser purchases the opportunity to promote the brand identity by exposing the landmark object they designed in the game space. The advertiser can design their own landmark building they want to be instantiated in the game as well as the list of actual geo-locations and the landmark DB in the game server is updated with those data. Once the battle is triggered, the advertising landmark buildings can be instantiated if their geo-locations are included in the battle region. FIG. 6 shows one example of an instantiated advertiser's landmark asset in the game.

Advertising Through PVE Battles (Selling PVE Battles)

This is to sell the PVE battle events themselves to advertisers. The clients have opportunities to design unique PVE monsters that can represent the company's identity. The clients also can choose the virtual monster's spawning position (actual geo-point) and the time. As the PVE monster has a huge Force, a large number of players can sense the monster and engage in the event battle, which means that this advertisement could be more efficient and impressive than other two advertisements. Once the client sets the time and location of the event battle, processes after that flow the same as the normal PVE battle.

Figure 7:
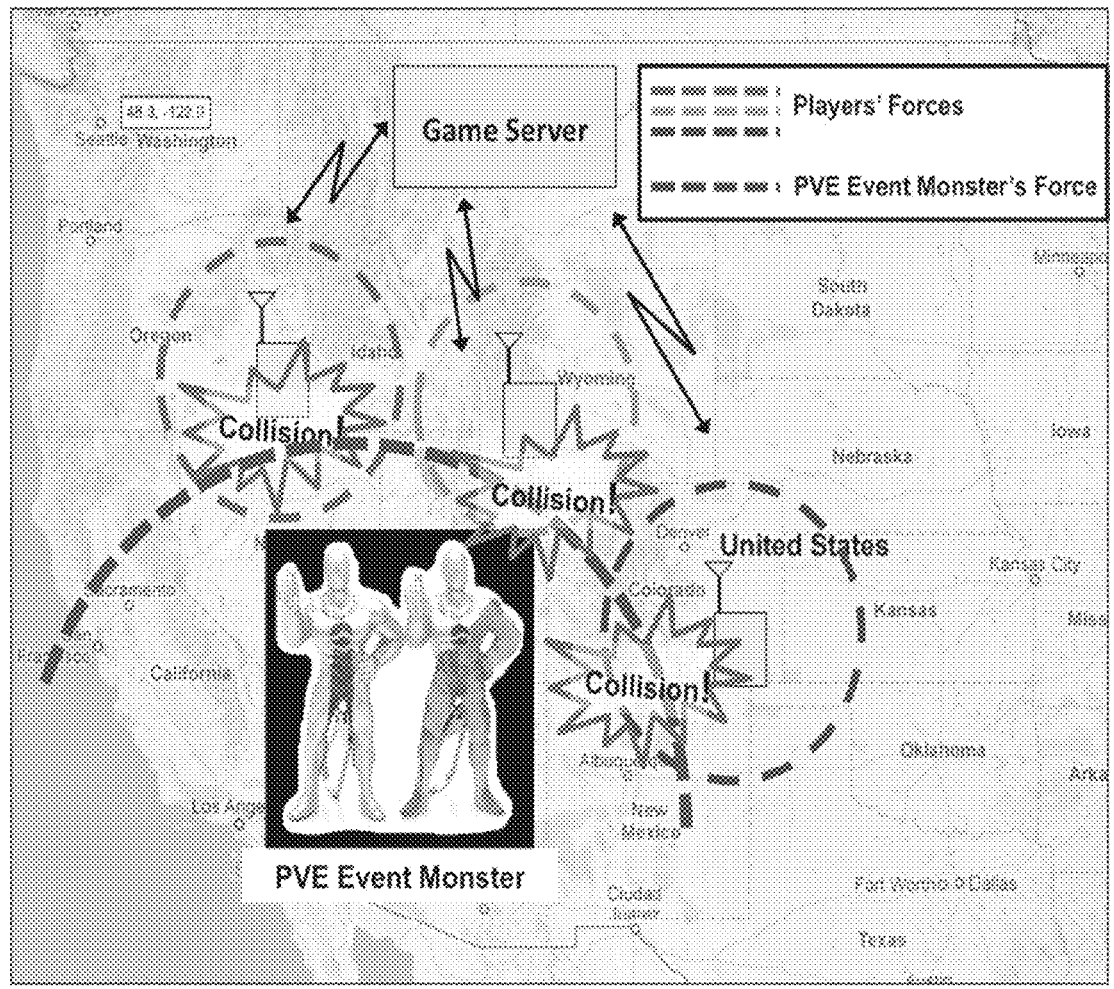
FIG. 7 is one example of a spawned event PVE monster and the collision scenario.
Figure 8:
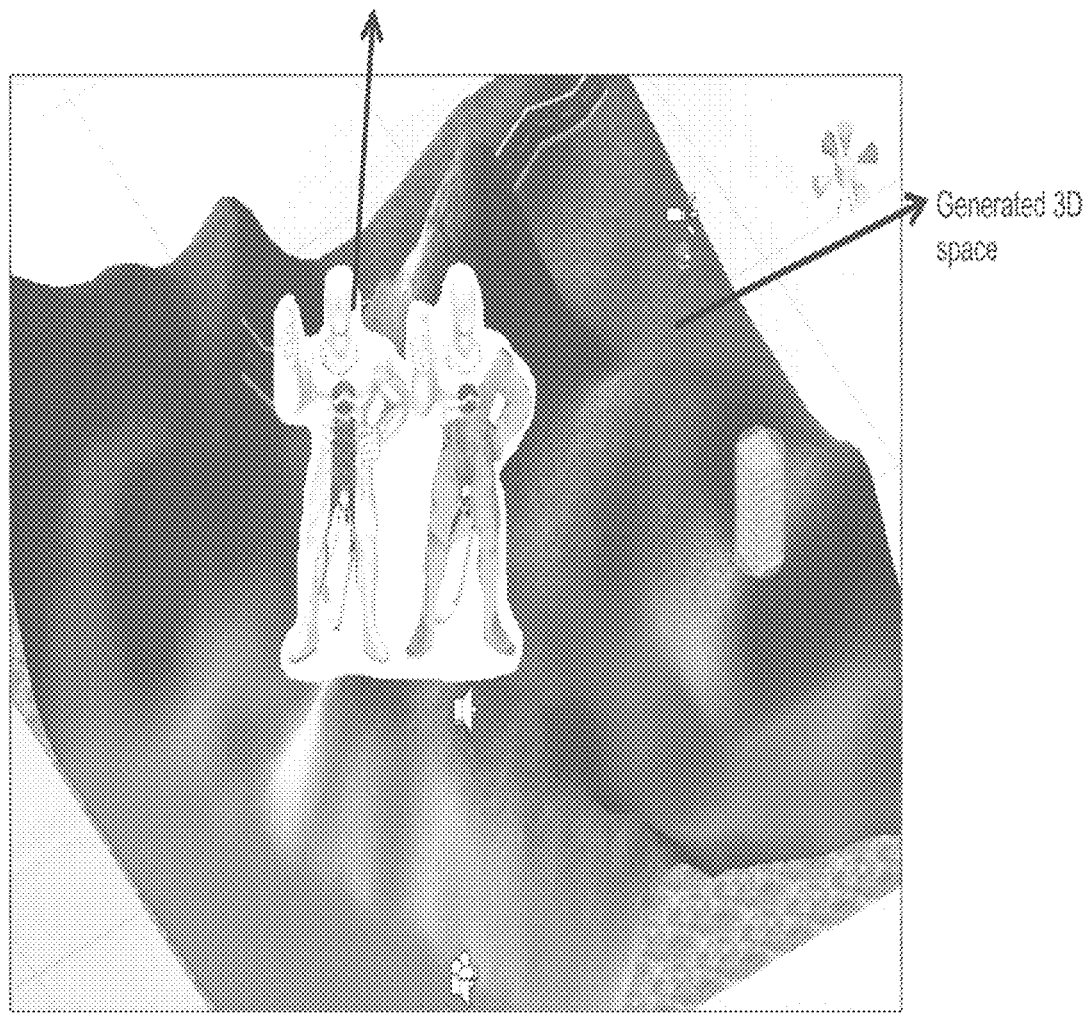
FIG. 8 is one example of an event PVE monster in the game space.

Other than the time and location, the client can design unique rewards for the players who defeated the monster such as a trophy with the company's logo, the unique title for the players and so on. This kind of reward has a prolonged effect because the reward is exposed to other players during ordinary battles so that they also can recognize the advertiser. FIG. 7 is one example of a spawned event PVE monster and the collision scenario. FIG. 8 is one example of an event PVE monster in the game space.

Figure 9:
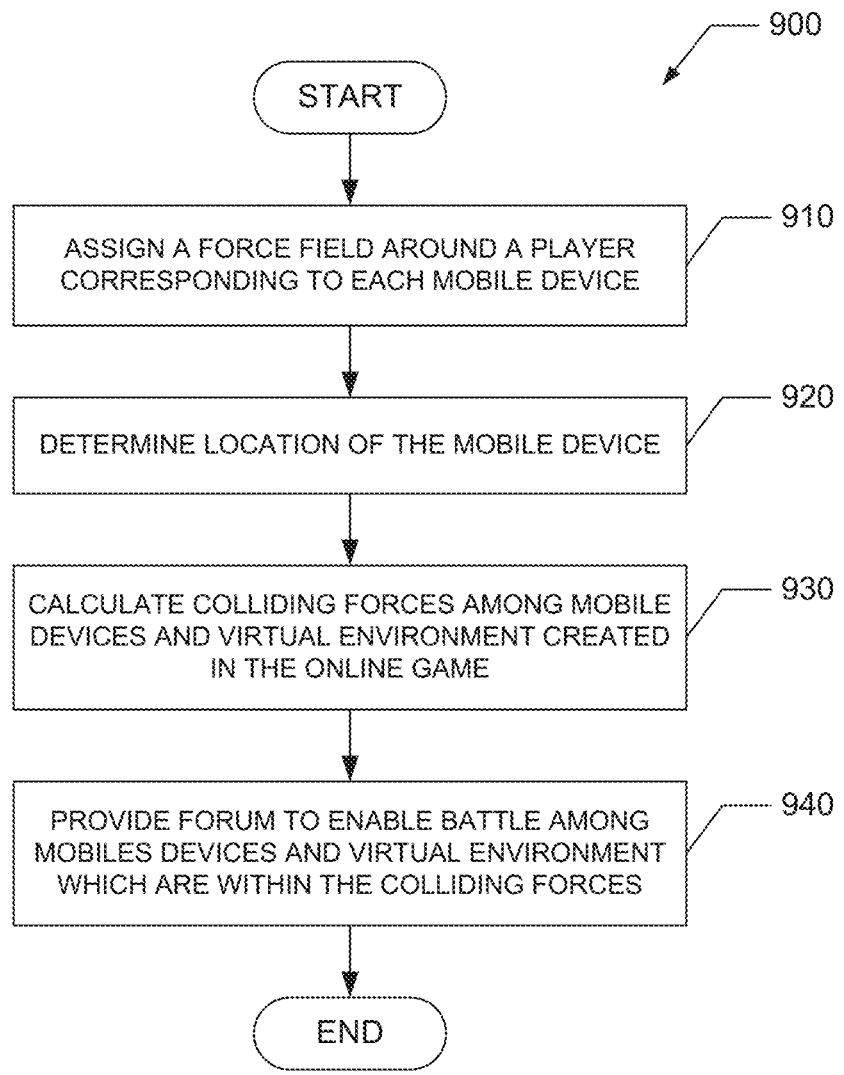
FIG. 9 is a flow diagram illustrating a method of generating a location-based online game for a plurality of mobile devices in accordance in accordance with one implementation of the present invention.

FIG. 9 is a flow diagram 900 illustrating a method of generating a location-based online game for a plurality of mobile devices in accordance with one implementation of the present invention. A force field around a player corresponding to each mobile device is assigned, at box 910. A radius of the force field is proportional to a score or experience point of the player in the online game. A location of each mobile device is then determined, at box 920. Colliding forces are calculated, at box 930, among the plurality of mobile devices and virtual environment created in the online game. Finally, at box 940, a forum is provided to enable a battle among the plurality of mobile devices and the virtual environment which are calculated as being in the colliding forces.

Figure 10A:
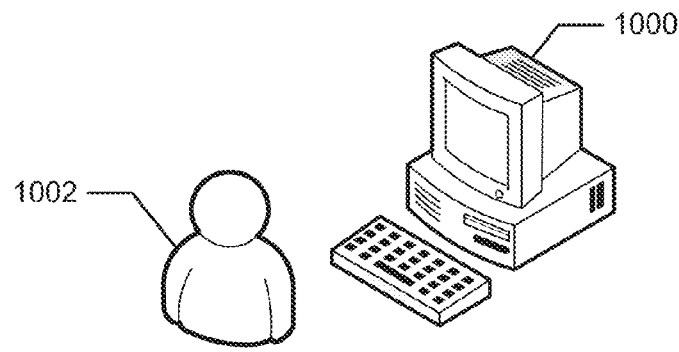
FIG. 10A illustrates a representation of a computer system and a use.

FIG. 10A illustrates a representation of a computer system 1000 and a user 1002. In one implementation, the user 1002 uses the computer system 1000 to generate a location-based online game.

Figure 10B:
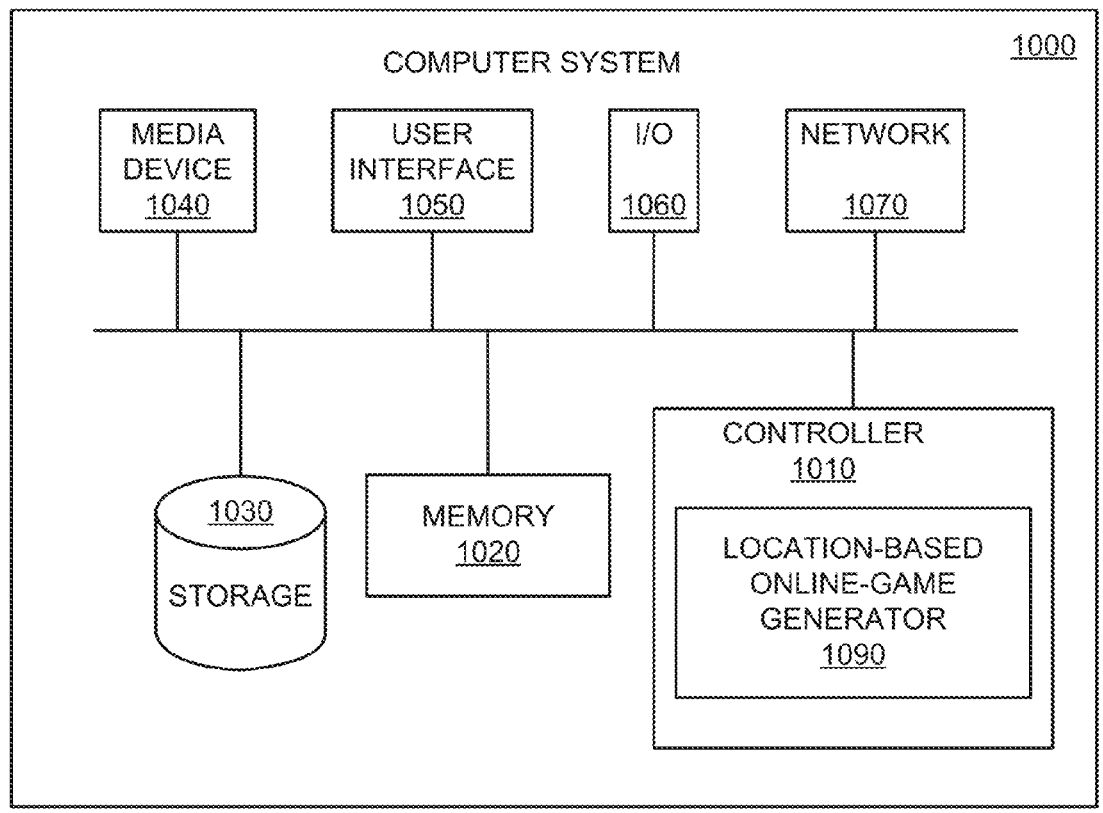
FIG. 10B is a functional block diagram illustrating the computer system hosting a location-based online game generator to define user interaction scenarios for an online game for mobile devices illustrated in FIG. 9.

FIG. 10B is a functional block diagram illustrating the computer system 1000 hosting a location-based online game generator 1090 to define user interaction scenarios for an online game for mobile devices illustrated in FIG. 9. The controller 1010 is a programmable processor and controls the operation of the computer system 1000 and its components. The controller 1010 loads instructions (e.g., in the form of a computer program) from the memory 1020 or an embedded controller memory (not shown) and executes these instructions to control the system.

Memory 1020 stores data temporarily for use by the other components of the computer system 1000. In one implementation, memory 1020 is implemented as RAM. In another implementation, memory 1020 also includes long-term or permanent memory, such as flash memory and/or ROM.

Storage 1030 stores data temporarily or long term for use by other components of the computer system 1000, such as for storing data and program of the location-based online game generator 1090. Storage 1030 is sometimes referred to as a computer-readable storage medium which stores non-transitory data. In one implementation, storage 1030 is a hard disk drive.

In its execution, the location-based online game generator 1090 is loaded into the memory 1020 or storage 1030 as a software system. Alternatively, this service can be implemented as separate hardware components (e.g., field programmable gate array (FPGA)) in the computer system 1000.

The media device 1040 receives removable media and reads and/or writes data to the inserted media. In one implementation, for example, the media device 1040 is an optical disc drive.

The user interface 1050 includes components for accepting user input from the user of the computer system 1000 and presenting information to the user. In one implementation, the user interface 1050 includes a keyboard, a mouse, audio speakers, and a display. The controller 1010 uses input from the user to adjust the operation of the computer system 1000.

The I/O interface 1060 includes one or more I/O ports to connect to corresponding I/O devices, such as external storage or supplemental devices (e.g., a printer or a PDA). In one implementation, the ports of the I/O interface 1060 include ports such as: USB ports, PCMCIA ports, serial ports, and/or parallel ports. In another implementation, the I/O interface 1060 includes a wireless interface for communication with external devices wirelessly.

The network interface 1070 includes a wired and/or wireless network connection, such as an RJ-45 or "Wi-Fi" interface (including, but not limited to 302.11) supporting an Ethernet connection.

The computer system 1000 includes additional hardware and software typical of computer systems (e.g., power, cooling, operating system), though these components are not specifically shown in FIG. 10B for simplicity. In other implementations, different configurations of the computer system can be used (e.g., different bus or storage configurations or a multi-processor configuration).

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A non-transitory computer-readable storage medium storing a computer program for a location-based online game for a plurality of mobile devices, the program comprising executable instructions that, which when executed by at least one processor, cause a computer to:
    provide a virtual environment for the online game;
    assign a first virtual force field around a first player operating a first mobile device, the first player associated with a first virtual character in the virtual environment of the online game;
    assign a second virtual force field around a second player operating a second mobile device, the second player associated with a second virtual character in the virtual environment of the online game;
    wherein, a radius of each of the first and second virtual force fields is proportional to a score or experience point of the associated player in the online game;
    determine a first geographical location of the first mobile device by receiving first GPS data from the first mobile device;
    determine a second geographical location of the second mobile device by receiving second GPS data from the second mobile device;
    determine if a collision event has occurred for the online game between the first mobile device and the second mobile device when the first virtual force field, based on the first geographical location, intersects the second virtual force field, based on the second geographical location; and
    in response to determining the collision event, provide a forum to enable a battle between the first virtual character and the second virtual character in the virtual environment of the online game,
    wherein metadata is sampled to generate the online game, the metadata including water data, highway data, road data, grass data, forest data, business area data, and residential area data.

2. A location-based 3-D online game system, comprising:
    a processor configured to:
    provide a virtual environment for the online game;
    assign a first virtual force field around a first player operating a first mobile device, the first player associated with a first virtual character in the virtual environment of the online game;
    assign a second virtual force field around a second player operating a second mobile device, the second player associated with a second virtual character in the virtual environment of the online game;
    wherein, a radius of each of the first and second virtual force fields is proportional to a score or experience point of the associated player in the online game;
    determine a first geographical location of the first mobile device by receiving first GPS data from the first mobile device; and
    determine a second geographical location of the second mobile device by receiving second GPS data from the second mobile device; and
    a collision detector configured to:
    determine if a collision event has occurred for the online game between the first mobile device and the second mobile device when the first virtual force field, based on the first geographical location, intersects the second virtual force field, based on the second geographical location; and in response to determining the collision event has occurred, provide a forum to enable battle between the first virtual character and the second virtual character in the virtual environment of the online game, wherein terrain metadata is sampled to generate a height map for the online game by a terrain builder, the terrain metadata including water data, highway data, road data, grass data, forest data, business area data, and residential area data.

3. The system of claim 2, wherein the collision detector is configured to generate a collision pair for a colliding force of the collision event calculated to exist between one of: the first player and the second player; or the first player and the virtual environment.

4. The system of claim 3, wherein said each of the first and second mobile devices downloads the height map and the terrain metadata for the collision pair.

* * * * *